United States Patent
Villarino, Jr. et al.

(10) Patent No.: US 10,773,226 B2
(45) Date of Patent: Sep. 15, 2020

(54) MIXING TANK STEADY BUSHING

(71) Applicants: Sergio Villarino, Jr., La Verne, CA (US); Sergio Villarino, Sr., Norwalk, CA (US)

(72) Inventors: Sergio Villarino, Jr., La Verne, CA (US); Sergio Villarino, Sr., Norwalk, CA (US)

(*) Notice: Subject to any disclaimer, the term of this patent is extended or adjusted under 35 U.S.C. 154(b) by 0 days.

(21) Appl. No.: 16/542,065

(22) Filed: Aug. 15, 2019

(65) Prior Publication Data
US 2020/0061561 A1 Feb. 27, 2020

Related U.S. Application Data

(60) Provisional application No. 62/723,261, filed on Aug. 27, 2018.

(51) Int. Cl.
| | |
|---|---|
| *F16C 35/02* | (2006.01) |
| *B01F 15/00* | (2006.01) |
| *F16M 13/02* | (2006.01) |
| *B01F 7/18* | (2006.01) |

(52) U.S. Cl.
CPC .......... *B01F 15/00707* (2013.01); *B01F 7/18* (2013.01); *F16C 35/02* (2013.01); *F16M 13/02* (2013.01); *B01F 2015/0011* (2013.01); *F16C 2320/16* (2013.01)

(58) Field of Classification Search
CPC ....... F16C 35/02; F16C 35/10; F16C 2320/16
See application file for complete search history.

(56) References Cited

U.S. PATENT DOCUMENTS

| | | | | |
|---|---|---|---|---|
| 4,932,787 A | * | 6/1990 | Fasano | B01F 7/18 366/246 |
| 5,088,832 A | | 2/1992 | Gambrill et al. | |
| 5,618,107 A | * | 4/1997 | Bartsch | B01F 7/22 366/279 |
| 6,866,414 B2 | * | 3/2005 | Kupidlowski | B01F 7/001 366/330.3 |
| 7,387,431 B2 | | 6/2008 | Blakley | |
| 7,402,023 B2 | * | 7/2008 | Kupidlowski | B01F 7/001 366/331 |
| 2015/0103620 A1 | * | 4/2015 | Stolzenfeld | B01F 7/16 366/204 |

FOREIGN PATENT DOCUMENTS

DE 102005049373 A1 * 4/2007 ........ B01F 15/00688

* cited by examiner

*Primary Examiner* — Phillip A Johnson
(74) *Attorney, Agent, or Firm* — Kenneth L. Green; Averill & Green

(57) ABSTRACT

A sanitary mixing tank steady bearing is replaceable without lifting a mixing tank shaft. The steady bearing is insertable into and removable from the bottom of a bearing support attached inside the base of the sanitary mixing tank. The steady bearing may thus be replaced by a service technician working through a man way/man hole on the top of the tank allowing service without lifting the mixing tank shaft. Gaps are provided between the bearing support and steady bearing allowing flushing material from around the steady bearing to easily maintain a sanitary environment.

16 Claims, 4 Drawing Sheets

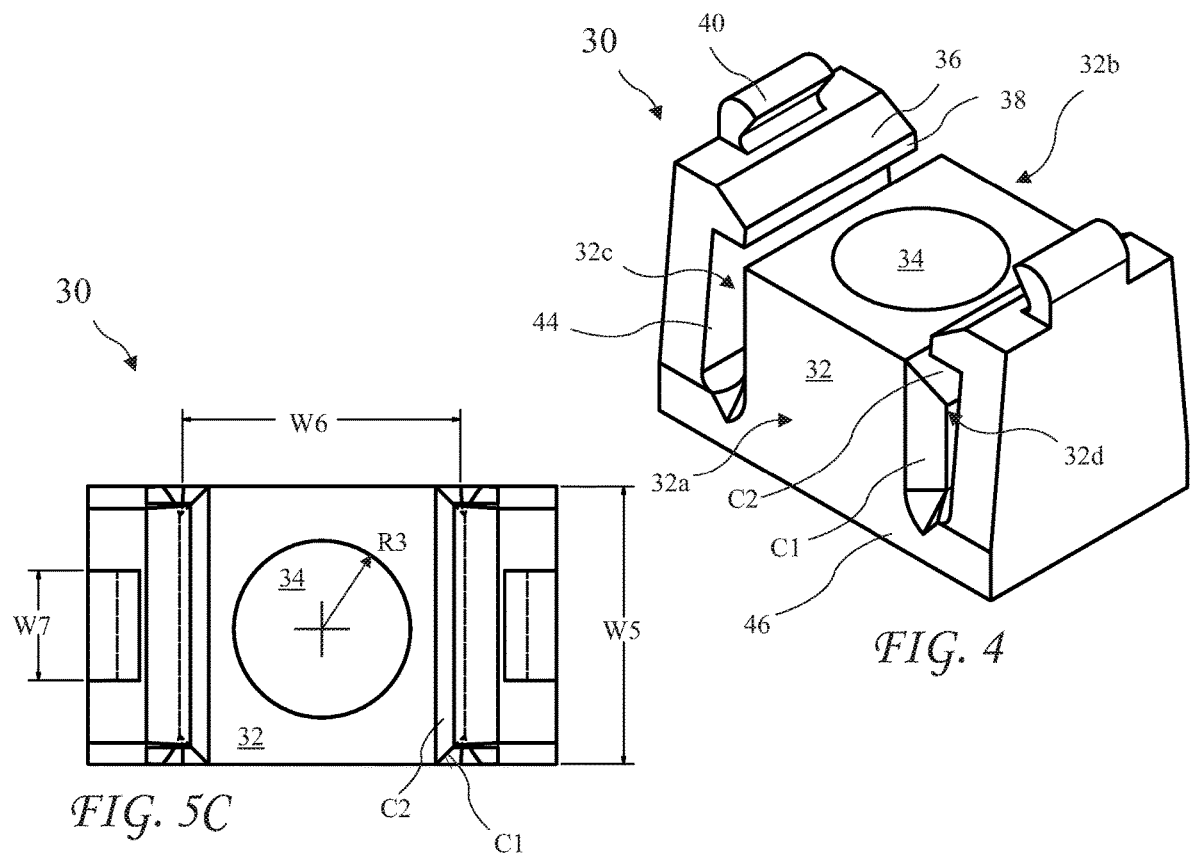
FIG. 4
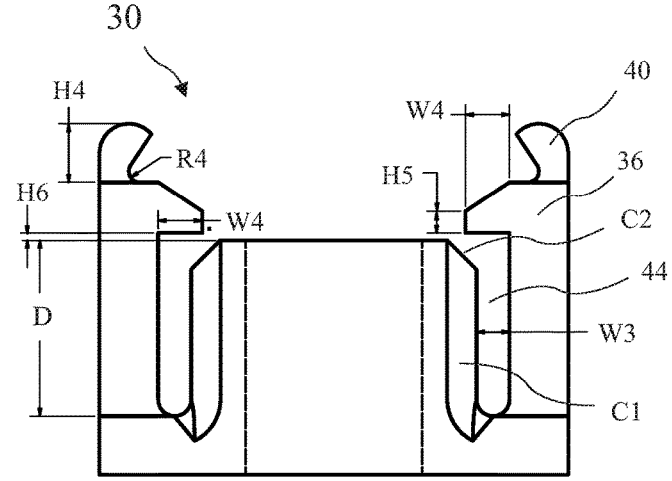
FIG. 5C
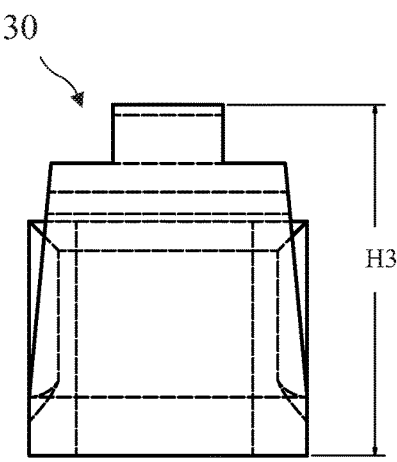
FIG. 5A
FIG. 5B
3 inches

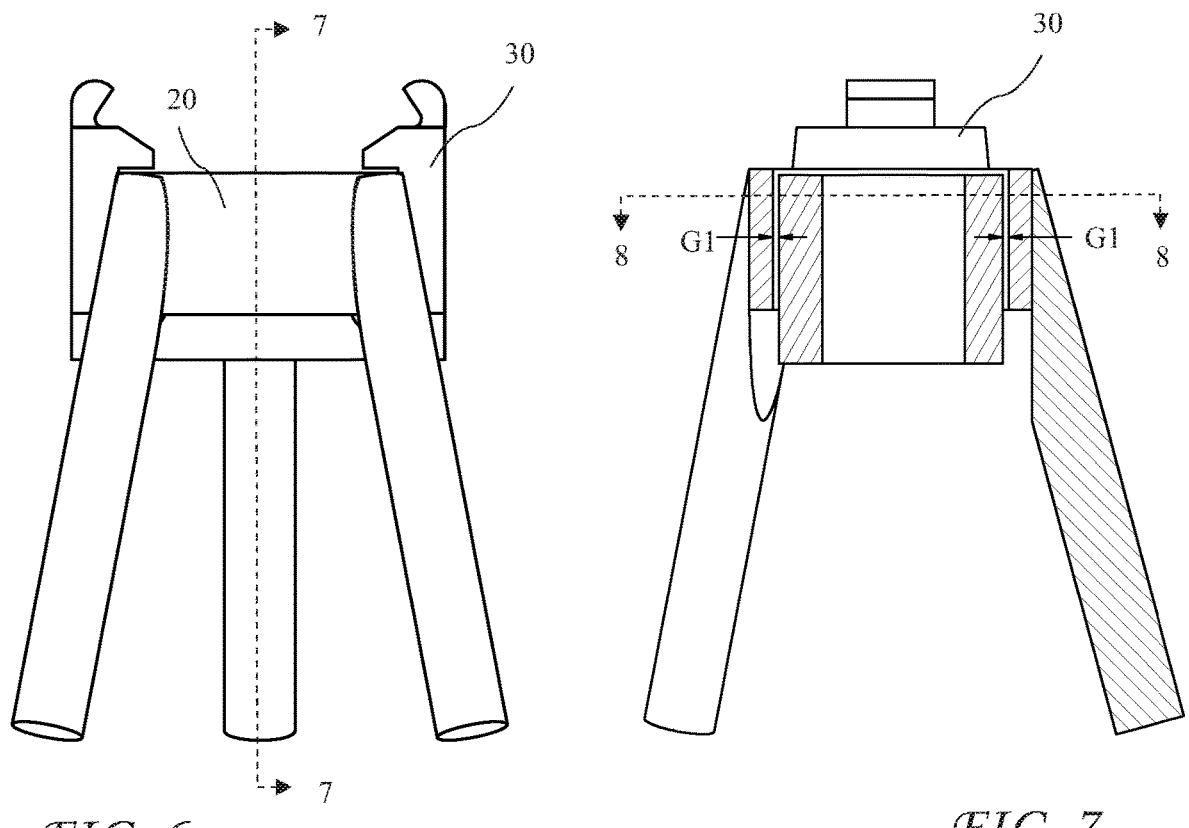

MIXING TANK STEADY BUSHING

CROSS-REFERENCE TO RELATED APPLICATIONS

The present application claims the priority of U.S. Provisional Patent Application Ser. No. 62/723,261 filed Aug. 27, 2018, which application is incorporated in its entirety herein by reference.

BACKGROUND OF THE INVENTION

The present invention relates to mixing tanks and in particular to steady bearings positioning a bottom end of the shaft in a sanitary mixing tank.

Sanitary mixing tanks are used for processing a variety of food, beverage, and cosmetic items. A rotating shaft reaches vertically through the tank and has blades to provide mixing. A steady bearing at the bottom of the tank positions the shaft. Due to material mixed in the tanks, the steady bearing eventually wear to the point where they must be replaced. Known tanks include a manway/man hole on the top of the tank allowing service, but replacing the steady bearings requires lifting the shaft, which in turn requires time consuming disassembling of mechanical parts at the top of the tank.

Known round steady bearings can spin with the rotation of the mixing tank shaft. As a result, material of the steady bearing contaminates the product being mixed in the tank, and the steady bearing wears out quickly.

BRIEF SUMMARY OF THE INVENTION

The present invention addresses the above and other needs by providing a sanitary mixing tank steady bearing which is replaceable without lifting a mixing tank shaft. The steady bearing is insertable into and removable from the bottom of a bearing support attached inside the base of the sanitary mixing tank. The steady bearing may thus be replaced by a service technician working through a manway/man hole on the top of the tank, allowing service without lifting the mixing tank shaft. Gaps are provided between the bearing support and steady bearing allowing flushing material from around the steady bearing to easily maintain a sanitary environment.

In accordance with one aspect of the invention, there is provided a steady bearing having a rectangular mounting surface. The rectangular mounting surface prevents the steady bearing from spinning along with the rotation of the mixing tank shaft which accelerates the wearing on steady bearing.

In accordance with another aspect of the invention, there is provided a steady bearing removable without lifting the mixing tank shaft. The steady bearing is removed by disengaging carry blades from a bearing holder and downwardly disengaging the steady bearing from the mixing tank shaft and bearing holder.

In accordance with another aspect of the invention, there is provided a steady bearing and bearing support including gaps between sides of the steady bearing and a bearing holder of the bearing support. The gaps prevent material in the mixing tank from being captured between the steady bearing and bearing support and facilitates cleaning the mixing tank.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 4 shows a top quartering view of a steady bearing according to the present invention.

FIG. 5A is a front view of the steady bearing according to the present invention.

FIG. 5B is a side view of the steady bearing according to the present invention.

FIG. 5C is a top view of the steady bearing according to the present invention.

FIG. 6 shows the side view of the bearing support of FIG. 3A with the steady bearing according to the present invention residing in the bearing support.

FIG. 7 shows a cross-sectional view of the bearing support and steady bearing according to the present invention, taken along line 7-7 of FIG. 6.

FIG. 8 shows a cross-sectional view of the bearing support and steady bearing according to the present invention, taken along line 8-8 of FIG. 7.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1:
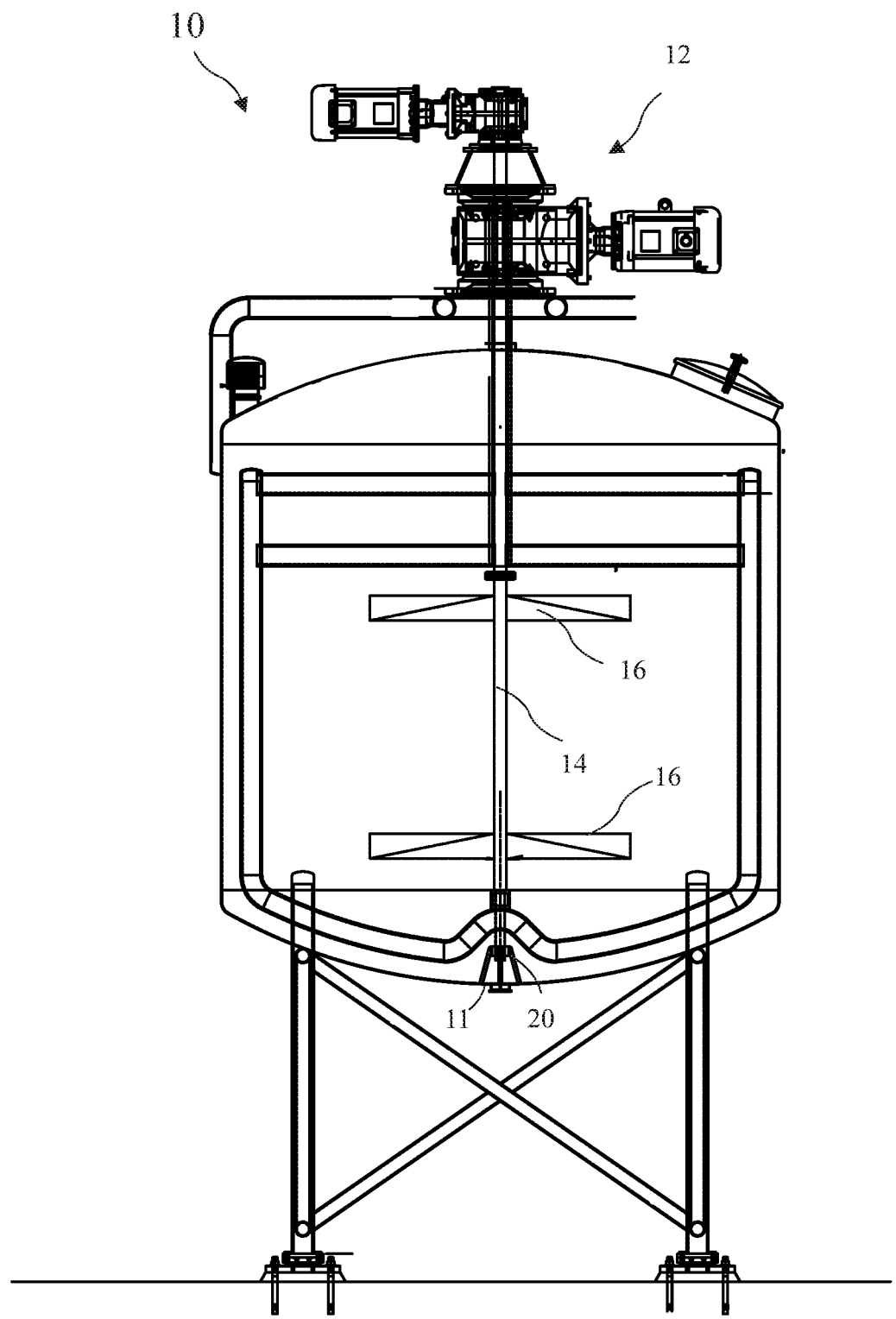
FIG. 1 shows a sanitary mixing tank according to the present invention.

FIG. 1 shows a sanitary mixing tank 10 having a steady bearing 30 (see FIGS. 4-5C) according to the present invention. The mixing tank includes a motor 12 at the top of the tank 10 rotating a shaft 14 carrying blades 16. The bottom of the shaft 14 is restrained by the steady bearing 30 in a bearing support 20. The bearing support 20 is attachable to a tank base 11.

Figure 3C:
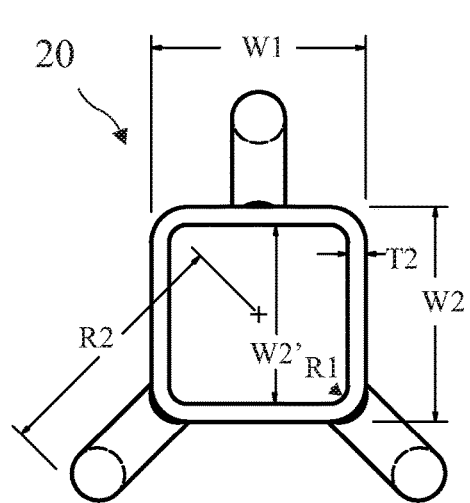
FIG. 3C is a top view of the bearing support according to the present invention.
Figure 2:
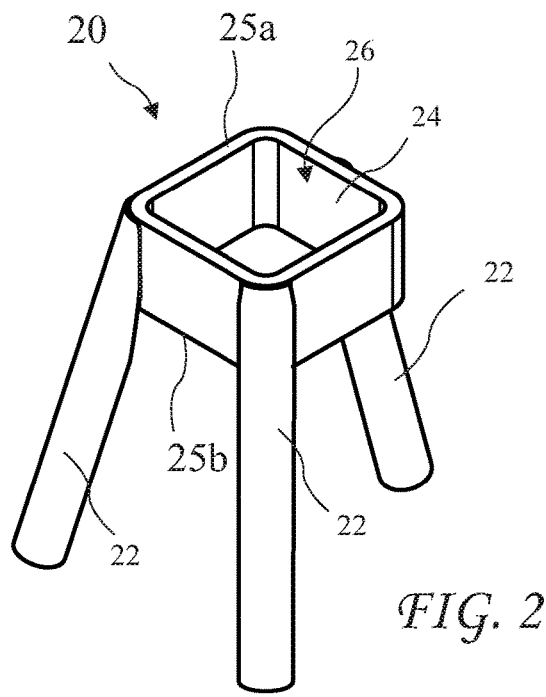
FIG. 2 shows a top quartering view of a bearing support according to the present invention.
Figure 3A:
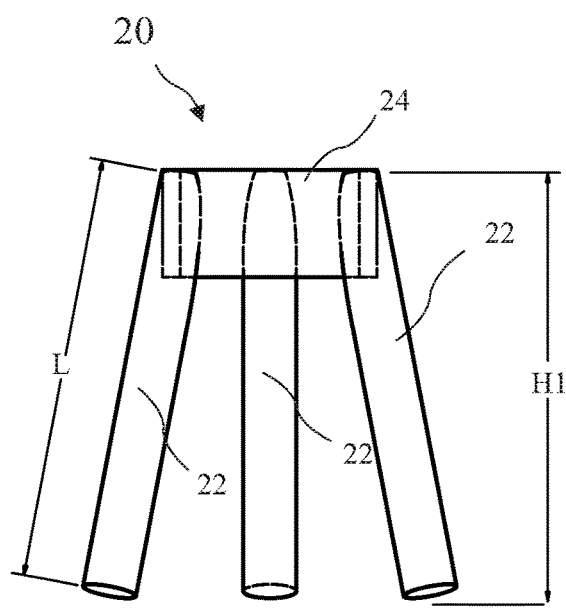
FIG. 3A is a front view of the bearing support according to the present invention.
Figure 3B:
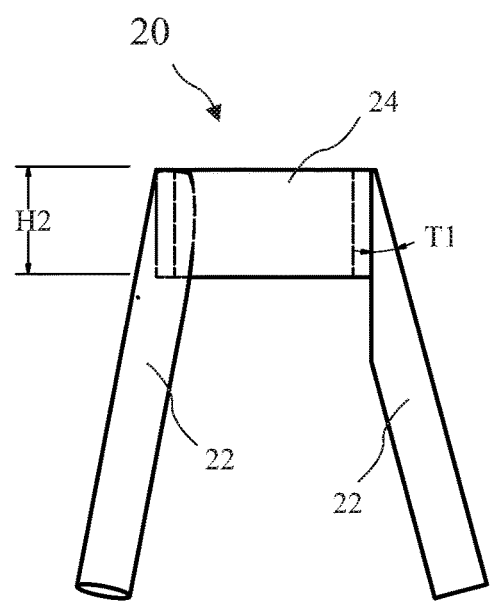
FIG. 3B is a side view of the bearing support according to the present invention.

FIG. 2 shows a top quartering view of the bearing support 20, FIG. 3A shows a front view of the bearing support 20, FIG. 3B shows a side view of the bearing support 20, and FIG. 3C shows a top view of the bearing support 20. The bearing support 20 includes legs 22 and bearing holder 24 having a top edge 25a and a bottom 25b. The bearing support 20 has a height H1 of six inches. The legs 22 have a length L of preferably about 5.9 inches and are tilted a tilt T of about 15 degrees, and are made of about 0.75 inch diameter solid round bar.

The bearing holder 24 has a width W1 of about three inches, a second width W2 of about three inches and an inside width W2' of about 2.5 inches, a height H2 of about 1.5 inches, and a thickness T2 of about 0.25 inches. Inside corners have a radius R1 of about 0.25 inches. The legs 22 extend horizontally a radius R2 of about 3.53 inches from the center of the bearing holder 24. The bearing holder 24 defines a vertical bearing passage 26 through the center of the bearing holder 24. The vertical bearing passage 26 preferably has a constant horizontal cross-section allowing the steady bearing 30 to be inserted into the bearing holder 24 from the bottom, but the cross-section may vary as long as the steady bearing 30 may be inserted from the bottom. The bearing holder 24 may be made from common three inch by three inch 0.25 inch thick square tubing.

FIG. 4 shows a top and quartering view of the steady bearing 30, FIG. 5A shows a front view of the steady bearing 30, FIG. 5B shows a side view of the steady bearing 30, and FIG. 5C shows a top view of the steady bearing 30. The steady bearing 30 includes a generally rectangular center 32 reaching up from a horizontal base 46 and having a vertical shaft passage 34 for receiving the shaft 14 (see FIG. 1). The center 32 has a front 32a, a rear 23b, a left side 32c, and a right side 32d.

The center 32 preferably has a rectangular horizontal cross-section, and more preferably a square horizontal cross-section and most preferably has a fifth width W5 of about 2.375 inches and a sixth width W6 of about 2.375 inches. The widths W5 and W6 may vary, but are preferably about 0.125 inches less than the inside width W2' of the bearing holder 24 (see FIG. 3C) providing a clearance for flushing debris from the tank 10. The center 32 includes the vertical shaft passage 34 having a radius R3 of about 1.510 inches accepting the shaft 14. Corners of the center 32 include a 45 degree chamfer C1 of about 0.25 inches and the top of the center 32 includes a 45 degree chamfer of about 0.25 inches. The clips 36 are a height H6 of about 0.0625 inches about the top of the center 32.

The steady bearing 30 further includes opposing clips 36 for retaining the steady bearing 30 to the bearing holder 24. The clips 36 include a face 38 having a height H5 of about 0.1875 inches and a width W4 of about 0.375 inches. Tabs 40 are attached to the clips 36 to spread the clips 36 to release the steady bearing 30 from the bearing holder 24. The tabs 40 have a height H4 of about 0.5 inches above the clips 36, a width W7 of about 0.9375 inches, and in inside radius R4 of about 0.0938 inches.

The steady bearing 30 further includes slots 44 allowing the steady bearing 30 to be inserted into the bearing holder 24. The slots 44 have rounded bottoms, a depth D of about 1.5 inches and a width W3 of about 0.28125 inches. The steady bearing 30 has an overall height H3 of about 3 inches. The steady bearing 30 is preferably made from Polytetrafluoroethylene (PTFE), a material approved by the FDA and 3A.

The side view of the bearing support of FIG. 3A with the steady bearing 30 residing in the bearing support 20, is shown in FIG. 6, a cross-sectional view of the bearing support 20 and steady bearing 30 according to the present invention, taken along line 7-7 of FIG. 6, is shown in FIG. 7, and a cross-sectional view of the bearing support and steady bearing according to the present invention, taken along line 8-8 of FIG. 7, is shown in FIG. 8. In the assembled steady bearing 30 and bearing support 20 there are gaps G1 between the front 32a and rear 32b (see FIG. 4) of the steady bearing 30 and the interior of the bearing holder 24 and gaps G2 between the right and left sides 32c and 32d (see FIG. 4) of the steady bearing 30 and the interior of the bearing holder 24. The gaps G1 are preferably between 0.05 inches and 0.08 inches and are more preferably about 1/16 inches and most preferably 1/16 inches. The gaps G2 are preferably between 0.02 inches and 0.04 inches and are more preferably about 1/32 inches and most preferably 1/32 inches.

While the invention herein disclosed has been described by means of specific embodiments and applications thereof, numerous modifications and variations could be made thereto by those skilled in the art without departing from the scope of the invention set forth in the claims.

We claim:

1. A sanitary mixing tank shaft support, comprising:
   a bearing support residing on a tank base of a sanitary mixing tank, the bearing support including a bearing holder having a vertical bearing passage therethrough for insertion of a steady bearing and the bearing holder having a top edge; and
   the steady bearing attached to the bearing support to laterally stabilize a mixing tank shaft, the steady bearing comprising:
      a center portion upwardly vertically inserted into the vertical bearing passage of the bearing holder and having clips configured to engage the top edge of the bearing holder and retaining the steady bearing in the bearing support; and
      a vertical shaft passage through the center portion configured to slide vertically up onto a sanitary mixing tank shaft bottom.

2. The sanitary mixing tank shaft support of claim 1, wherein the bearing passage of the bearing support and the center portion of the steady bearing include cooperating features preventing the steady bearing from rotating in the bearing support.

3. The sanitary mixing tank shaft support of claim 2, wherein the cooperating features of the bearing passage of the bearing support and the center portion of the steady bearing are non-round shapes.

4. The sanitary mixing tank shaft support of claim 2, wherein the cooperating features of the bearing passage of the bearing support and the center portion of the steady bearing are rectangular shapes.

5. The sanitary mixing tank shaft support of claim 1, wherein;
   the steady bearing includes a horizontal base;
   the center portion reaches upward from the horizontal base; and
   the horizontal base contacts the bearing holder to limit inserting of the center portion upward and into the bearing holder.

6. The sanitary mixing tank shaft support of claim 1, wherein:
   clips reach upward from the horizontal base of the steady bearing;
   slots separate the clips from the center portion of the steady bearing; and
   the clips are engaged with the bearing holder to attach the steady bearing to the bearing holder.

7. The sanitary mixing tank shaft support of claim 1, wherein gaps are present between the center portion and the bearing holder when the steady bearing is attached to the bearing holder.

8. The sanitary mixing tank shaft support of claim 7, wherein the gaps are between 0.02 inches and 0.08 inches wide.

9. The sanitary mixing tank shaft support of claim 1, wherein the bearing support includes three legs.

10. The sanitary mixing tank shaft support of claim 9, wherein the three legs are attached to a tank base of a sanitary mixing tank.

11. The sanitary mixing tank shaft support of claim 1, wherein:
the steady bearing includes a horizontal base contacting the bearing holder to limit inserting of the center portion upward and into the bearing holder; and
the clips reach up from the horizontal base of the steady bearing and retain the steady bearing in the bearing holder.

12. The sanitary mixing tank shaft support of claim 1, wherein the clips reach vertically outside the bearing holder to the top edge of the bearing holder and retain the steady bearing in the bearing holder.

13. The sanitary mixing tank shaft support of claim 1, wherein the clips reach vertically outside the bearing holder from a bottom of the bearing holder to the top edge of the bearing holder and retain the steady bearing in the bearing holder.

14. The sanitary mixing tank shaft support of claim 1, wherein sides of the bearing holder reside in slots between the clips and the center portion.

15. A sanitary mixing tank shaft support, comprising:
a bearing support comprising:
a bearing holder having a generally rectangular vertical bearing passage therethrough for vertical insertion of a steady bearing; and
three legs for supporting the bearing support on a mixing tank base; and
the steady bearing attached to the bearing support to laterally stabilize a mixing tank shaft, the steady bearing comprising:
a generally rectangular center portion configured to insert upwardly vertically into the vertical bearing passage of the bearing holder with a bearing shaft in place and cooperating with the bearing holder to prevent rotation of the steady bearing in the bearing holder;
a vertical shaft passage through the center portion configured to slide vertically up onto a sanitary mixing tank shaft bottom;
a horizontal base;
the center portion reaches upward from the horizontal base;
the horizontal base contacts the bearing holder to limit inserting of the center portion upward and into the bearing holder; and
the steady bearing configured to attach to the bearing support by upwardly vertically inserting the steady bearing into the bearing holder and onto the mixing tank shaft without raising the mixing tank shaft, and configured to downwardly remove from the bearing support without raising the mixing tank shaft.

16. A sanitary mixing tank shaft support, comprising:
a bearing support comprising:
a bearing holder having a generally rectangular vertical bearing passage therethrough for vertical insertion of a steady bearing; and
three legs for supporting the bearing support on a mixing tank base;
the steady bearing attached to the bearing support to laterally stabilize a mixing tank shaft, the steady bearing comprising:
a generally rectangular center portion configured to insert upwardly vertically into the vertical bearing passage of the bearing holder with a bearing shaft in place and cooperating with the bearing holder to prevent rotation of the steady bearing in the bearing holder;
a vertical shaft passage through the center portion configured to slide vertically up onto a sanitary mixing tank shaft bottom;
a horizontal base;
the center portion reaches upward from the horizontal base;
the horizontal base contacts the bearing holder to limit inserting of the center portion upward and into the bearing holder; and
the steady bearing configured to attach to the bearing support by upwardly vertically inserting the steady bearing into the bearing holder and onto the mixing tank shaft without raising the mixing tank shaft, and configured to downwardly remove from the bearing support without raising the mixing tank shaft; and
front and rear gaps between front, rear of the center portion and the bearing holder and side gaps between sides of the center portion and the bearing holder when the steady bearing is attached to the bearing support and stabilizing the mixing tank shaft, the front and rear gaps $\frac{1}{16}$ inches and the side gaps $\frac{1}{32}$ inches.

* * * * *